Figure 1:
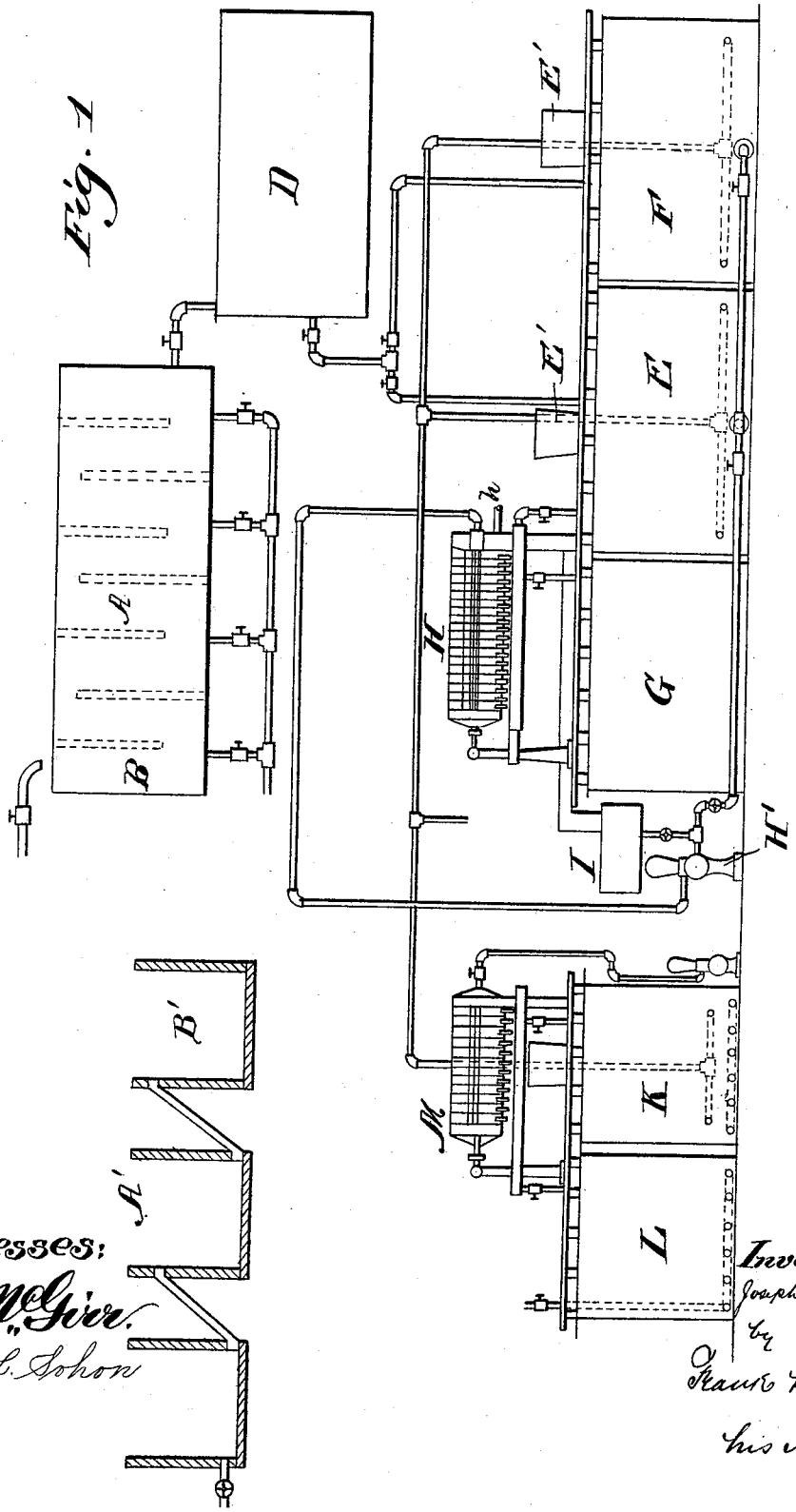

(No Model.) 2 Sheets—Sheet 1.

J. VAN RUYMBEKE.
PROCESS OF RECOVERING PRODUCTS FROM SPENT SOAP LYE.

No. 522,134. Patented June 26, 1894.

Witnesses:
J. B. McGier.
A. L. Sohon.

Inventor:
Joseph Van Ruymbeke
by
Frank L. Dyer
his Attorney (No Model.) 2 Sheets—Sheet 2.

J. VAN RUYMBEKE.
PROCESS OF RECOVERING PRODUCTS FROM SPENT SOAP LYE.

No. 522,134. Patented June 26, 1894.

Witnesses:
J. B. McGiver.
A. L. Sohon

Inventor:
Joseph Van Ruymbeke
by Frank L. Dyer.
his Attorney

UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

PROCESS OF RECOVERING PRODUCTS FROM SPENT SOAP-LYE.

SPECIFICATION forming part of Letters Patent No. 522,134, dated June 26, 1894.

Application filed March 7, 1894. Serial No. 502,703. (No specimens.)

*To all whom it may concern:*

Be it known that I, JOSEPH VAN RUYMBEKE, a subject of the King of Belgium, residing at Chicago, Cook county, in the State of Illinois, have invented certain new and useful Improvements in Processes of Recovering Products from Spent Soap-Lye; and I do hereby declare the following to be a full, clear, and exact description of the invention, which will enable others skilled in the art to which it appertains to make and use the same.

This invention relates to the recovery of glycerin, common salt and Glauber's salt from soap-maker's spent lyes, and relates more particularly to the thorough purification of such lyes previous to distillation. In carrying out this process, I make use of the apparatus illustrated in the drawings, in which—

Figure 2:
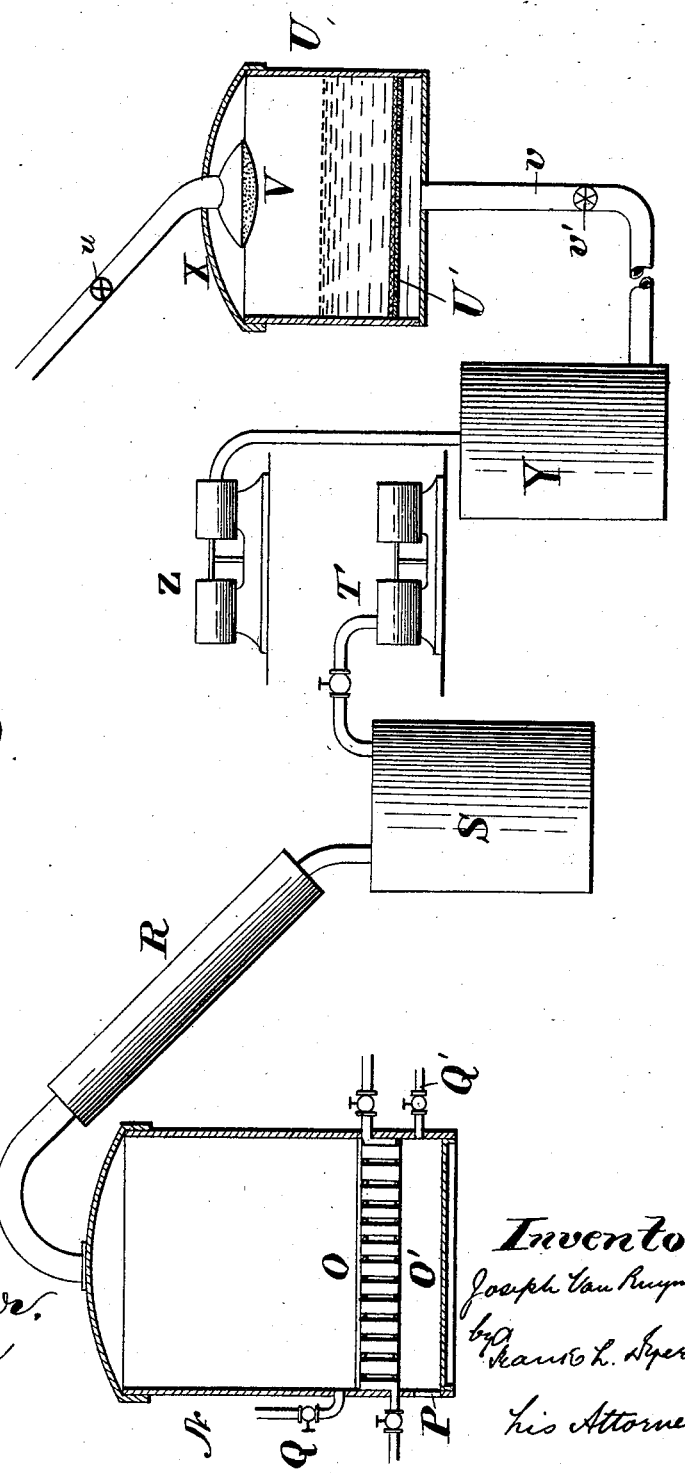

Figure 1, represents a section of a working plant used in the chemical purification of the lye, and Fig. 2, represents a section of the evaporator and washer.

The essential points of novelty of the process will appear from the detailed description subjoined together with the appended claims.

In the course of salting out closed soaps by means of common salt, there is obtained a sub-lye containing common salt, water, glycerin, nitrogenous and some other impurities. The separated soap still carries impurities, and is therefore closed again, and again salted out; and this process is repeated until a soap stock of sufficient purity is obtained. In the course of salting out, the sub-lye first obtained is generally used to salt out fresh batches of soap to increase its percentage of glycerin. In this way sub-lyes containing varying degrees of glycerin and impurities are obtained, the most impure of which are called "rosin lye," "niger" or "niger lye." In the recovery of glycerin from soap lye as usually practiced the very dark and impure lyes are allowed to run to waste. By my process, I recover the glycerin from all of the various sub-lyes so that no liquors are allowed to run to waste from the soap kettle.

In the apparatus used to carry out this process, A' represents a series of connected settling tanks, in place of which may be used a single settling tank A divided into compartments. Next to the settling tank is a liming tank D, which is connected with the mixing tanks E and F.

H, is a filter press supplied with material from the mixing tanks E and F through suitable piping by means of the pump H'.

G, is a tank to receive the filtrate from the filter press H, said tank being connected by suitable piping (not shown) with the tank K, where the lye is heated and supplied with a solution of caustic soda when needed, said tank K being connected with the filter press M.

L, is a tank to receive the filtered liquor from the filter press M, said tank being also supplied with a heating coil.

I, is a tank in which the filter cake from the filter press H, is mixed with water, such mixture being subsequently passed through the filter press H. The mixing tanks E, F and K are supplied with perforated pipes for blowing air through the liquids to keep them agitated during the process of mixing.

N, is an evaporator, heated by means of the tubular steam drum O.

P, is a door for removing the salt separated from the lye during concentration.

Q, is a pipe for introducing the liquid into the vacuum evaporator by suction, and Q' is a pipe for withdrawing the concentrated liquid from the evaporator.

R, is a condenser, S, a receiver, and T, is a vacuum pump which maintains a vacuum in the evaporator N.

U, is a washer.

V, is a rose in the washer.

X, is the cover of the washer.

Y, is a receiver communicating with the washer, and Z, is a vacuum pump connected with the washer.

In carrying out this process the sub-lye is first run into the compartment B of the settling tank A, or into the first tank B' of the series of connected settling tanks A'. When using a single tank, the compartments are so connected that the liquid flows from one compartment at a distance of about one third of the way from the bottom to the next compartment. By this arrangement the sediment which is deposited accumulates in the bottom of the first compartment, while the greater part of the soap will rise to the top of and float on the liquid in the first compartment, whence it may be removed from time to time, and will often be found to be of considerable value, as it may be added to the batches of the subsequent soap boiling. This preliminary clarification is made more effective by allowing the sub-lye to cool to about 120° Fahrenheit, in the settling tank, whereby the soap will separate more quickly and thoroughly at the top, and the suspended material will also be more quickly deposited as a sediment, which sediment is removed by valved pipes at the bottom of the compartments. After this preliminary clarification the liquid is drawn from the last compartment, if a single tank is used, or from the last tank, when a series of tanks is used, and in this way both the clearest and coolest portion of the settled lye is obtained. From the settling tank or tanks, the sub-lye is passed into the liming tank D where it is partially clarified by the addition of slacked lime. The quantity of lime added for this purpose need not be carefully calculated; and although the proportions used are not closely limited, I may state that a quantity of lime varying from one quarter, to two pounds of lime calculated as calcium monoxid (Ca.O) will generally be found suitable for the treatment of one hundred gallons of sub-lye. After the lye has been introduced into the mixing tank, it is analyzed for free caustic and carbonated alkali, the alkali which is combined with rosin or fatty acids not being included, such determination being readily effected in the ordinary way by means of a standard acid, phenol phthalein being used as an indicator. After the percentage of caustic and carbonated alkali has been determined, ferric sulfate is added in quantity sufficient to neutralize such free alkalies within two to six one-hundredths of one-per-cent. of the total alkalinity. The amount of ferric sulfate needed having been thus determined, it is dissolved in hot water, added to the sublye, and thoroughly mixed therewith in the mixing tanks E and F, tubs E' being provided in which the ferric sulfate is dissolved. After this operation, the lye is passed through the filter press H, by means of the pump H', generally cold; but when the lye is very rich in glycerin it is necessary to heat it, heating coils, not shown, being provided for the purpose in the mixing tanks, because the ferric hydrate, and ferric soap formed by the reaction partly remain dissolved in the cold, although they do not re-dissolve after having been heated and precipitated. The cake in the press is generally steamed before removing it, so as to wash out its contained glycerin. For this purpose the steam is supplied by means of a valved pipe $h$. Sometimes, and especially when abundance of exhaust steam is available for evaporation, the filter cake obtained from the first filtration is mixed with water in the tank I, and the mixture is filtered, so as to insure a more complete recovery of the glycerin. The liquid coming from the filter press is generally almost white and clear; but sometimes through a defect in one or more of the filter cloths it shows some turbidity. Besides it always contains in solution certain salts of iron, such as, and mainly, ferric acetate. If it were concentrated in this condition, the sodium chlorid or common salt obtained, would be contaminated by the suspended insoluble matter not separated in the filter press, and by the ferric hydrate or basic ferric acetate precipitated by the decomposition of the ferric acetate and other decomposable ferric salts. To avoid this, the lye is conducted to the tank K, heated to the boiling point by the steam coil, in said tank, and, if necessary to precipitate the iron completely, a small yet sufficient quantity of caustic soda is added. After such precipitation, the lye is passed through the filter press M, whence it will issue perfectly clear into the tank L, and is ready for evaporation in the evaporator N. I have discovered that in evaporating these lyes, the first salt which separates after the salting point has been reached consists essentially of sodium sulfate, often to the extent of eighty per cent., the remaining twenty per cent. consisting of sodium chlorid or common salt. Therefore, when it is desired to manufacture Glauber's salt or to obtain the sodium chlorid or common salt as free as possible from the sulfate, the evaporation is stopped when most of the sulfate has separated; and the crude sulfate thus obtained is purified by solution in water and crystallization, such operation being repeated if necessary until sufficiently pure Glauber's salt is obtained. After the separation of the impure sodium sulfate as above described, the evaporation of the liquid is continued until it reaches a density of 28° Baumé as drawn from the evaporator or 30° Baumé at 15° centigrade. Where the separation of the sodium sulfate is not desired, the evaporation may be carried on to this point continuously from the beginning. At the above described density (30° Baumé at 15° centigrade) the lye contains about fifty per cent. of glycerin, and most of the salt originally contained therein has been separated. The evaporation above described although capable of being performed in an open vessel, is preferably carried on in a vacuum evaporator such as shown in the drawings and heated by the tubular steam drum O, below which is a space O' of sufficient capacity to hold the salt which is separated during the concentration, and from which the salt may be drawn through the side door P or by other means, the liquid contents of the still having been drawn off as close as possible to the upper layer of the deposited salt by means of one or more valved pipes Q', located one above the other in proximity to the level which the salt generally attains in the receptacle, say, at about one-eighth from the bottom of the same when of a cylindrical shape. The salt is drawn while still hot into a shallow tank U, provided with a false bottom or screen U' a couple of inches above the bottom. The screen or false-bottom U' is generally covered with a coarse cloth, and the bottom of the tank U communicates by means of a pipe $v$ with a valve $v'$ having a closed cylinder Y connected with the vacuum pump Z. After the salt has been placed in this shallow tank and leveled, connection with the cylinder Y is established by opening the valve $v'$ of the pipe $v$. In this way most of the lye adhering to the salt is removed by suction, produced by the vacuum in the cylinder Y, and the salt becomes fairly dry in a few minutes. After all the adhering lye removable by suction as above described has been separated from the salt, a cover X carrying a helical perforated pipe or a rose V, is put on the tank, and steam is admitted from any suitable source of supply by opening the valve $u$, the vacuum pump Z being also set in motion. The jets of steam from the perforated pipe or rose V, strike the upper layer of the salt and the steam is drawn through the salt in a more or less condensed form whereby, the salt is washed and thus further purified, after which it is ready for the soap house. The liquid passing from the shallow tank U to the cylinder Y, which liquid consists of water of condensation, glycerin washed from the salt, and salt dissolved during the washing, is transferred from the latter to any desired point by gravity, suction, or other means preferably to the evaporator or still. The partially concentrated lye having a density of 30° Baumé at 15° centigrade, as above stated, is further concentrated in the described vacuum evaporator N, or any form of vacuum pan until it attains a specific gravity of 34° Baumé at 15° centigrade. An additional quantity of salt separates during this operation which salt is drained and dried in the manner above described. The reason for carrying on the concentrating process in two stages as above described, is that the salt when impregnated with concentrated crude glycerin is difficult to dry and to free from its adhering glycerin. By operating as described only a very small portion of the salt removed from the vacuum has this disadvantage. By carrying on the evaporation in a vacuum of about twenty-six to twenty-eight inches, and with steam at low pressure, of from two to ten pounds, the loss of glycerin by evaporation is reduced to a minimum. In fact there is practically no loss of glycerin from this source, when the process is carried out as above described. The product of the last evaporation is crude glycerin or a saturated solution of common salt, in glycerin, together with a small portion of impurities. The product is now ready for distillation. The distillation should be carried on in a vacuum of from twenty-six to thirty inches, and at a comparatively low temperature, preferably such as is obtained by heating the liquid in the still by means of a coil into which passes saturated steam, at from eighty to one hundred and fifty pounds' pressure, and by injecting into the liquid steam at about the temperature of the steam in the coil, this process being described in my Patent No. 458,647, dated September 1, 1891. As steam entering the still expands until it reaches the vacuum therein maintained and by such expansion suffers a reduction in temperature, I have found it advantageous to allow the steam to expand previous to its introduction into the still in a coil of pipe of larger diameter than the pipe from the boiler, and to reheat the expanded steam while passing through such coil by surrounding the latter with a steam heated drum or by other means this process being described in detail and claimed in my concurrent application filed October 9, 1893, and numbered serially 487,690. By the latter process the glycerin distills rapidly at a temperature of 300° Fahrenheit, without suffering any decomposition, whereby a purer product is obtained than is usually found in the market.

The residue from the stills, sometimes called "foots" or "glycerin foots" and which on account of the large amount of sodium acetate and other organic soda salts therein contained, can no longer be distilled for glycerin, yet as the glycerin in such "foots" is unaltered, it can be recovered and transformed into crude glycerin by the special process described in my concurrent application filed November 17, 1893, and numbered serially 491,244; and which briefly consists in the addition of a mineral acid in quantity sufficient to decompose the said organic salts, volatilizing the volatile organic acids thus set free, and afterward treating the purified residue in the ordinary way.

In the processes of distilling glycerin generally employed when the distillation has reached the point where the glycerin ceases to come over there is left in the still a tarry residue resulting from a decomposition of the glycerin, which decomposition entails a loss varying from five to twelve per cent. of the glycerin contained in the crude lye, which loss is avoided by my combination of processes as above described. The distilled glycerin and injected steam are condensed in the ordinary way by surface condensers and collected in suitable receivers. The distillate is then concentrated in vacuo until it reaches a specific gravity of 1.262 or more if desired at 15° centigrade. This product is generally further purified by means of a second distillation, followed by a concentration of the distilled product. This course is made necessary because it is impossible to completely prevent small quantities of crude glycerin from being entrained or carried off with the distillate, which after concentration will often contain one-hundredth of one-per-cent. of sodium chlorid. The glycerin is also generally apt to be contaminated with a slight quantity of an organic impurity of a resinous nature, which, as it has a lower boiling point than the glycerin, comes off with the first portion of the distillate, and may thus be separated either from the first or from the second distillate. In place of separating this resinous impurity by fractional distillation, it may be removed by washing the sweet waters of the first distillation with lime, and in filtering it through bone black, prepared black, or other suitable filtering materials.

In place of using ferric sulfate as above described, I may use any other form of soluble ferric salt such as the chlorid or a salt of aluminum, such as the sulfate.

What I claim, and desire to secure by Letters Patent, is as follows:

1. In the art of recovering products from spent soap lye, the improvement which consists in removing the suspended heavy impurities as a sediment, allowing the lye to cool, whereby suspended soap is brought to the surface and dissolved soap is separated and suspended and as such is brought to the surface, and then skimming off separated soap from the surface, the operation being carried on previous to the addition of any chemical to the lye.

2. In the art of recovering products from spent soap lye, the improvement which consists in first allowing the lye to cool, then removing separately the suspended heavy impurities and part of the soap contained therein, and subsequently liming the lye, as and for the purpose described.

3. In the art of recovering products from spent soap lye, the improvement which consists in adding ferric sulfate to the lye in quantity sufficient to almost neutralize the contained alkaline hydrate and carbonate, and then filtering the lye, as and for the purpose described.

4. In the art of recovering products from spent soap lye, the improvement which consists in separately removing the suspended heavy impurities and part of the soap contained therein, previous to any addition of chemicals, and subsequently adding to the lye sufficient ferric sulfate to almost neutralize the contained alkaline hydrate and carbonate, as and for the purpose described.

5. In the art of recovering products from spent soap lye, the improvement which consists in separately removing the suspended heavy impurities and part of the contained soap, then liming the lye, and adding to the lye sufficient ferric sulfate to almost neutralize its contained alkaline hydrate and carbonate, as and for the purpose described.

6. In the art of recovering products from spent soap lye, the improvement which consists in first separately removing suspended impurities and part of the soap, previous to any addition of chemicals, then adding ferric sulfate to the lye, to almost neutralize its contained alkaline hydrate and carbonate, and then filtering the lye, as and for the purpose described.

7. In the art of recovering products from spent soap lye, the improvement which consists in precipitating fatty and other impurities by addition of ferric sulfate in quantity sufficient to almost neutralize the contained alkaline hydrate and carbonate, passing the lye through a filter press and subsequently steaming the filter cake produced, as and for the purpose described.

8. In the art of recovering products from spent soap lye, the improvement which consists in precipitating fatty and other impurities by addition of ferric sulfate in quantity sufficient to almost neutralize the contained alkaline hydrate and carbonate, passing the lye through a heated filter press and subsequently steaming the filter cake produced, as and for the purpose described.

9. In the art of recovering products from spent soap lye, the improvement which consists in precipitating fatty and other impurities by addition of ferric sulfate in quantity sufficient to almost neutralize the contained alkaline hydrate and carbonate, passing the lye through a filter press, steaming the filter cake while in the filter press removing the filter cake, mixing it with water and passing the mixture through a filter press, as and for the purpose described.

10. In the art of recovering products from spent soap lye the improvement which consists in adding ferric sulfate in sufficient quantity to almost neutralize the contained alkaline hydrate and carbonate, filtering the liquid, bringing it up to boiling point and filtering it again, as and for the purpose described.

11. In the art of recovering products from spent soap lye, the improvement which consists in adding to the lye ferric sulfate in sufficient quantity to almost neutralize the contained alkaline hydrate and carbonate, filtering the liquid, adding a small quantity of an alkali, bringing it to the boiling point and filtering it again, as and for the purpose described.

12. In the art of recovering products from spent soap lye, the improvement which consists in first adding ferric sulfate in quantity sufficient to almost neutralize the contained alkaline hydrate and carbonate, filtering the liquid, evaporating the liquid, recovering a mixture of sodium sulfate and chlorid, and separating the sulfate from such mixture, as and for the purpose described.

13. In the art of recovering products from spent soap lye, the improvement which consists in first purifying the lye by a suitable precipitating agent, then evaporating the lye, until it reaches a density of about 30° Baumé at 15° centigrade, and separating the mixture of sodium sulfate and chlorid obtained during such evaporation, then continuing the evaporation until the liquid is sufficiently concentrated, and recovering separately the salt obtained in the latter operation, as and for the purpose described.

14. In the art of recovering products from spent soap lye, the improvement which consists in precipitating impurities from the liquid, filtering and concentrating the liquid until the solution is anhydrous, distilling it, subjecting the first distillate to the action of lime and filtering it to remove volatile impurities, as and for the purpose described.

This specification signed and witnessed the 24th day of February, 1894.

JOSEPH VAN RUYMBEKE.

Witnesses:
WILLIAM W. FORBES,
JOHN B. BAUMANN.